(12) United States Patent
Hill

(10) Patent No.: US 9,988,309 B2
(45) Date of Patent: Jun. 5, 2018

(54) THERMAL BARRIER COATING MATERIAL WITH ENHANCED TOUGHNESS

(71) Applicant: Skyworks Solutions, Inc., Woburn, MA (US)

(72) Inventor: Michael David Hill, Frederick, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 526 days.

(21) Appl. No.: 13/896,884

(22) Filed: May 17, 2013

(65) Prior Publication Data
US 2015/0259251 A1    Sep. 17, 2015

Related U.S. Application Data

(60) Provisional application No. 61/649,351, filed on May 20, 2012.

(51) Int. Cl.
| | |
|---|---|
| *C04B 35/44* | (2006.01) |
| *C04B 35/488* | (2006.01) |
| *C23C 30/00* | (2006.01) |
| *C23C 4/11* | (2016.01) |
| *F01D 5/28* | (2006.01) |

(52) U.S. Cl.
CPC ............ *C04B 35/44* (2013.01); *C04B 35/488* (2013.01); *C23C 4/11* (2016.01); *C23C 30/00* (2013.01); *F01D 5/288* (2013.01); *C04B 2235/3201* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3241* (2013.01); *C04B 2235/3246* (2013.01); *C04B 2235/3248* (2013.01); *C04B 2235/3251* (2013.01); *C04B 2235/3262* (2013.01); *C04B 2235/3272* (2013.01); *C04B 2235/3286* (2013.01); *C04B 2235/3294* (2013.01); *C04B 2235/3298* (2013.01); *C04B 2235/762* (2013.01); *C04B 2235/765* (2013.01);

(Continued)

(58) Field of Classification Search
CPC .............. C04B 35/4885; C04B 35/486; C04B 2235/3246; C23C 24/04; C23C 4/105
See application file for complete search history.

(56) References Cited

U.S. PATENT DOCUMENTS

| | | | | |
|---|---|---|---|---|
| 4,886,768 | A | * | 12/1989 | Tien .............................. 501/104 |
| 5,008,221 | A | * | 4/1991 | Ketcham ............... C04B 35/119 501/103 |

(Continued)

*Primary Examiner* — Karl E Group
(74) *Attorney, Agent, or Firm* — Knobbe Martens Olson and Bear LLP

(57) ABSTRACT

Disclosed are compositions, devices and methods related to thermal barrier coating materials having enhanced toughness. In some embodiments, a multiphase ceramic can include a first phase formed from a cubic and/or a tetragonally stabilized metal oxide, and a second phase formed from a magnetoplumbite-based aluminate that is chemically compatible with the first phase. Various example applications in which such materials can be utilized are disclosed.

20 Claims, 10 Drawing Sheets

(52) U.S. Cl.
CPC .... *C04B 2235/768* (2013.01); *C04B 2235/80* (2013.01); *C04B 2235/9607* (2013.01)

(56) References Cited

U.S. PATENT DOCUMENTS

| | | | | |
|---|---|---|---|---|
| 6,007,926 | A * | 12/1999 | Provenzano et al. | 428/633 |
| 6,380,113 | B1 * | 4/2002 | Kim | C04B 35/4885 |
| | | | | 264/664 |
| 6,602,814 | B1 * | 8/2003 | Gadow et al. | 501/152 |
| 7,399,722 | B2 * | 7/2008 | Shikata et al. | 501/105 |
| 7,618,911 | B2 * | 11/2009 | Pracht et al. | 501/152 |
| 7,723,249 | B2 * | 5/2010 | Doesburg | C04B 35/486 |
| | | | | 428/325 |
| 2009/0292366 | A1 * | 11/2009 | Burger et al. | 623/23.56 |
| 2009/0317767 | A1 * | 12/2009 | Burger et al. | 433/201.1 |
| 2012/0082849 | A1 * | 4/2012 | Nonnet et al. | 428/402 |

* cited by examiner

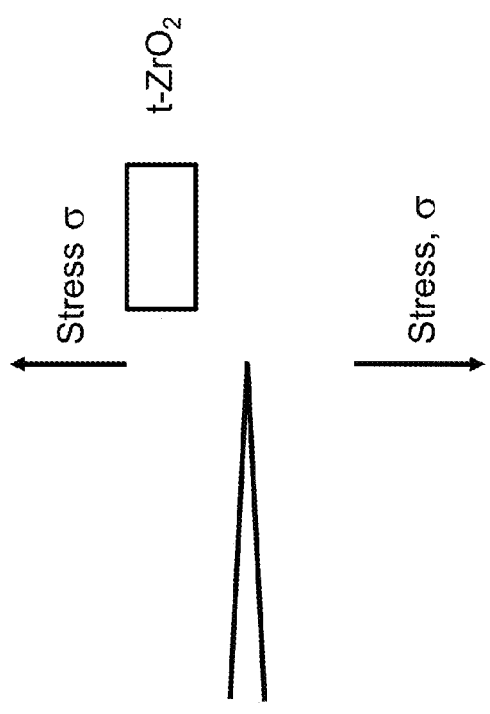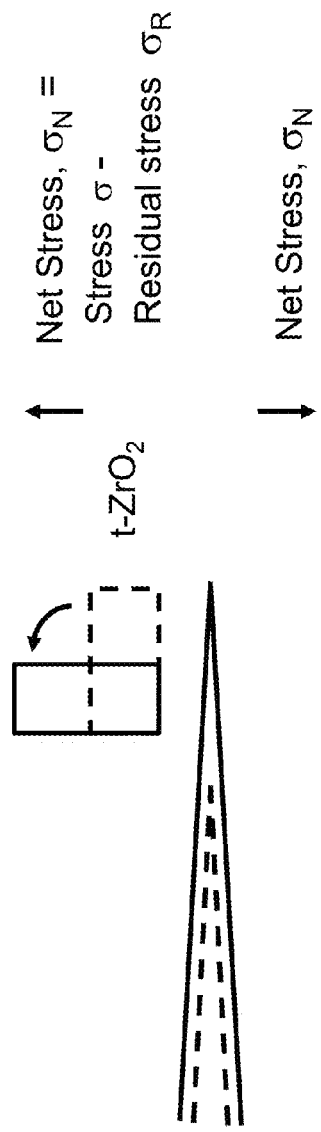
Fig. 3A
Fig. 3B

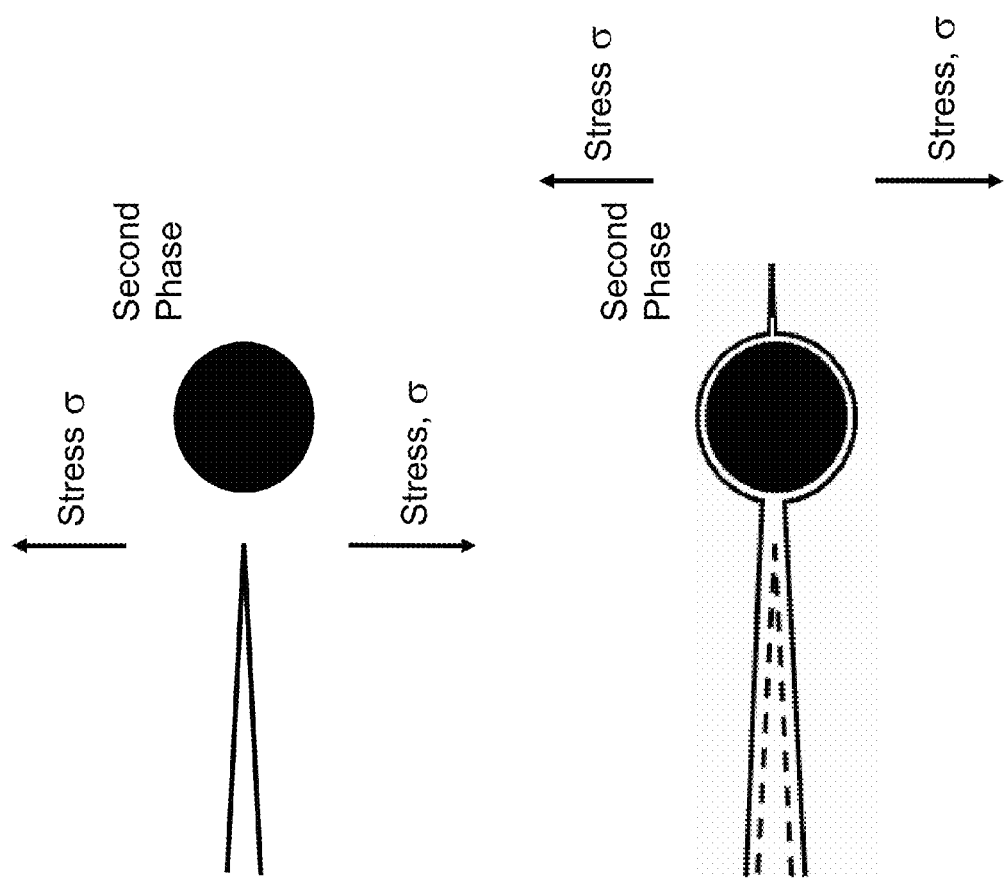

THERMAL BARRIER COATING MATERIAL WITH ENHANCED TOUGHNESS

CROSS-REFERENCE TO RELATED APPLICATIONS

This application claims priority to U.S. Provisional Application No. 61/649,351 filed May 20, 2012 and entitled "THERMAL BARRIER COATING MATERIAL WITH ENHANCED TOUGHNESS," which is expressly incorporated by reference herein in its entirety.

BACKGROUND

Field

Embodiments of the disclosure relate generally to ceramic materials and, in particular, to ceramics having improved resistance to erosion and impact damage.

Description of the Related Art

Gas turbine engines are a class of internal combustion engine commonly employed in power generation and aviation applications. In these engines, air enters the engine and is compressed to high pressure. The pressurized air is channeled through a combustion chamber, where a fuel is burned to produce heat. As a result, the temperature of the pressurized air is increased to an engine operating temperature, resulting in an increase in its velocity. This hot, high velocity, pressurized air is subsequently directed at a turbine, which extracts mechanical energy from the air by spinning. Depending upon the application, the spinning turbine may be employed to generate electrical power (e.g., gas-turbine generators) or to generate thrust/lift for aircraft (e.g., turbojet and turbofan engines).

In general, the thermal efficiency of gas turbine engine (the ratio of work output to heat input) is related to the difference between the temperature of the relatively cold input gas and the relatively hot, pressurized gas. That is, as the temperature difference between the intake air and the air at the engine operating temperature increases, so does the thermal efficiency of the engine (i.e., the more work is done for a given amount of input heat). Based upon this consideration, higher operating temperatures are favored, based purely on thermodynamic considerations.

In practical terms, though, the operating temperature of gas turbine engines, and therefore the thermal efficiency of the engine, is limited by the uppermost use temperature of materials forming the hot zone components of the gas-turbine engine (e.g., turbine blades, combustor liners, combustor shrouds, etc.). Traditionally, hot zone components have been formed from superalloys which possess high mechanical strength, creep resistance (resistance to time-dependent deformation under stress), and resistance to chemical attack (e.g., oxidation, corrosion, etc.), among other considerations. For example, modern superalloys can operate at temperatures up to approximately 1100° C.

To increase the temperature capability of superalloys in use, thermal barrier coatings may be applied to superalloy surfaces. For example, FIG. 1 presents a schematic illustration of a layered thermal barrier coating (TBC) system deposited upon a substrate such as the superalloy. The system can include a bond coat layer and a ceramic TBC layer (other layers may also be present but are omitted for simplicity). The bond coat can be applied to the substrate. In FIG. 1, the left surface of the substrate is assumed to be adjacent to a flow of cooling air and the right surface of the thermal barrier coating is assumed to be adjacent to a flow of hot gases. Accordingly, on the substrate side, the bond coat can protect the substrate against oxidation and corrosion. On the TBC side, the bond coat can provide adhesion to the TBC layer.

FIG. 1 further presents a schematic representation of temperature within the substrate, bond coat, and TBC during engine operation as a function of position (dashed line. For example, the TBC layer may thermally insulate the underlying superalloy from the operating temperature of the gas turbine engine (e.g., the hot gas temperature) and sustain a significant temperature difference between the load-bearing superalloy and the TBC surface. For example, air-cooled superalloy turbine blades including a protective TBC may be used at temperatures as high as about 200° C. above the melting temperature of the superalloy.

TBCs may undergo failure due to a number of different mechanisms. For example, foreign objects may enter the engine and impact on the TBC surface. When the foreign objects are relatively small (e.g., dust, etc.), such impacts may result in erosion of the TBC over time. Alternatively, when the foreign objects are larger (rocks, tools, etc.), such impacts may result in impact damage such as cracks, which can grow and lead to spallation of the TBC.

SUMMARY

According to a number of implementations, the present disclosure relates to a multiphase ceramic having a first phase formed from a cubic and/or a tetragonally stabilized metal oxide and a second phase formed from a magnetoplumbite-based aluminate that is chemically compatible with the first phase.

In some embodiments, the first phase can be selected from the group consisting of tetragonally stabilized zirconium oxide ($ZrO_2$) and tetragonally stabilized hafnium oxide ($HfO_2$). The first phase can include a stabilizing element selected from the group consisting of Mg, Ca, La, In, Sc, Ce, Pr, Nd, Sm, Gd, Dy, Tb, Eu, Ho, Er, Yb, Y, Lu, Tm, Ga, Fe, Mn, Cr, and Bi. The first phase can include two stabilizing elements, with the first stabilizing element selected from the group consisting of Mg, Ca, La, In, Sc, Ce, Pr, Nd, Sm, Gd, Dy, Tb, Eu, Ho, Er, Yb, Y, Lu, Tm, Ga, Fe, Mn, Cr, and Bi and the second stabilizing element selected from the group consisting of Nb and Ta.

In some embodiments, the magnetoplumbite can be an aluminate. In some embodiments, the magnetoplumbite can be $LnAl_{11}O_{18}$ and Ln can be selected from the group consisting of La, Pr, Nd, and Sm. In some embodiments, the magnetoplumbite can be $NdAl_{11}O_{18}$. In some embodiments, the magnetoplumbite can be present in a volume fraction between about 10% to less than 50% on the basis of the total volume of the ceramic.

In some embodiments, the ceramic can include $ZrO_2$ or $HfO_2$, $Al_2O_3$, and $Ln_2O_3$ and Ln can be selected from the group consisting of La, Pr, Nd, and Sm. The relative fractions of $ZrO_2$, $Al_2O_3$, and $Ln_2O_3$ can be given by the ternary phase field of the $ZrO_2$—$Al_2O_3$-$Ln_2O_3$ phase diagram consisting essentially of cubic zirconia and $LnAl_{11}O_{18}$.

In some embodiments, the ceramic can further include $Ln'_2O_3$ where Ln' is a trivalent stabilizer of $ZrO_2$ or $HfO_2$. Ln' can be different than Ln and can be selected from the group consisting of lanthanides, Sc, Y, Lu, Ga, In, and Bi.

In some embodiments, the ceramic can further include $MO_x$ where M is a magnetoplumbite former with aluminum oxide. M can be selected from the group consisting of Na, K, Mg, Li, Ca, Sr, and Ba.

In some embodiments, the ceramic can further include M'O$_x$ where M'O is a divalent stabilizer of ZrO$_2$ or HfO$_2$. M" can be selected from the group consisting of Mg and Ca.

In some embodiments, the ceramic can further include M"O$_x$ where M"O is a pentavalent stabilizer of ZrO$_2$ or HfO$_2$. M" can be selected from the group consisting of Nb, Ta, and Sb.

In some embodiments, the ceramic can further include M'O$_x$ where M'O is a divalent stabilizer of ZrO$_2$ or HfO$_2$. M' can be selected from the group consisting of Mg and Ca.

In some embodiments, the ceramic can further include M"O$_x$ where M"O is a pentavalent stabilizer of ZrO$_2$ or HfO$_2$. M" can be selected from the group consisting of Nb, Ta, and Sb.

In some embodiments, the ceramic can further include AO where AO is a divalent stabilizer of ZrO$_2$ or HfO$_2$. AO can be selected from the group consisting of Mg and Ca.

According to some teachings, the present disclosure relates to a thermal barrier coating having a ceramic layer that includes a first phase formed from a cubic and/or a tetragonally stabilized metal oxide and a second phase formed from a magnetoplumbite-based aluminate that is chemically compatible with the first phase.

In accordance with a number of implementations, the present disclosure relates to a thermally insulated component for a gas turbine engine. The component includes a substrate configured to receive a coating. The component further includes a low thermal conductivity ceramic coating deposited upon a surface of the substrate. The ceramic coating includes a first phase formed from a cubic and/or a tetragonally stabilized metal oxide and a second phase formed from a magnetoplumbite-based aluminate that is chemically compatible with the first phase.

In some implementations, the present disclosure relates to a ceramic ingot. The ceramic ingot has a ceramic composition that includes a first metal oxide component that is capable of being stabilized in a tetragonal phase. The ceramic composition further includes a second oxide component that is capable of stabilizing the first metal oxide component in the tetragonal phase. The ceramic composition further includes a third oxide component, different than the first and second oxide components, that forms a compound with the second oxide component that is chemically compatible with a tetragonally-stabilized metal oxide formed from the first metal oxide component and the second oxide component.

In a number of implementations, the present disclosure relates to a ceramic powder having a ceramic composition. The ceramic composition includes a first metal oxide component that is capable of being stabilized in a tetragonal phase. The ceramic composition further includes a second oxide component that is capable of stabilizing the first metal oxide component in the tetragonal phase. The ceramic composition further includes a third oxide component, different than the first and second oxide components, that forms a compound with the second oxide component that is chemically compatible with a tetragonally-stabilized metal oxide formed from the first metal oxide component and the second oxide component.

In some implementations, the present disclosure relates to a method for fabricating a multiphase ceramic. The method includes forming a first phase from a cubic and/or a tetragonally stabilized metal oxide. The method further includes forming a second phase from a magnetoplumbite-based aluminate that is chemically compatible with the first phase.

According to a number of implementations, the present disclosure relates to a method for forming a thermal barrier coating. The method includes providing substrate configured to receive a coating. The method further includes forming a ceramic layer on a surface of the substrate. The ceramic layer includes a first phase formed from a cubic and/or a tetragonally stabilized metal oxide. The ceramic layer further includes a second phase formed from a magnetoplumbite-based aluminate that is chemically compatible with the first phase.

In a number of implementations, the present disclosure relates to a method for manufacturing a thermally insulated component for a gas turbine engine. The method includes providing a substrate configured to receive a coating. The method further includes depositing a low thermal conductivity ceramic coating upon a surface of the substrate. The ceramic coating includes a first phase formed from a cubic and/or a tetragonally stabilized metal oxide. The ceramic coating further includes a second phase formed from a magnetoplumbite-based aluminate that is chemically compatible with the first phase.

According to some teachings, the present disclosure relates to a method for fabricating a ceramic ingot having a ceramic composition. The method includes forming a first metal oxide component that is capable of being stabilized in a tetragonal phase. The method further includes forming a second oxide component that is capable of stabilizing the first metal oxide component in the tetragonal phase. The method further includes forming a third oxide component, different than the first and second oxide components, that forms a compound with the second oxide component that is chemically compatible with a tetragonally-stabilized metal oxide formed from the first metal oxide component and the second oxide component.

According to some teachings, the present disclosure relates to a method for forming a ceramic powder having a ceramic composition. The method includes forming a first metal oxide component that is capable of being stabilized in a tetragonal phase. The method further includes forming a second oxide component that is capable of stabilizing the first metal oxide component in the tetragonal phase. The method further includes forming a third oxide component, different than the first and second oxide components, that forms a compound with the second oxide component that is chemically compatible with a tetragonally-stabilized metal oxide formed from the first metal oxide component and the second oxide component.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 3A-3B are schematic illustrations of a ferroelastic toughening mechanism.

FIGS. 4A-4B are schematic illustrations of a crack bridging toughening mechanism.

DETAILED DESCRIPTION OF SOME EMBODIMENTS

Figure 1:
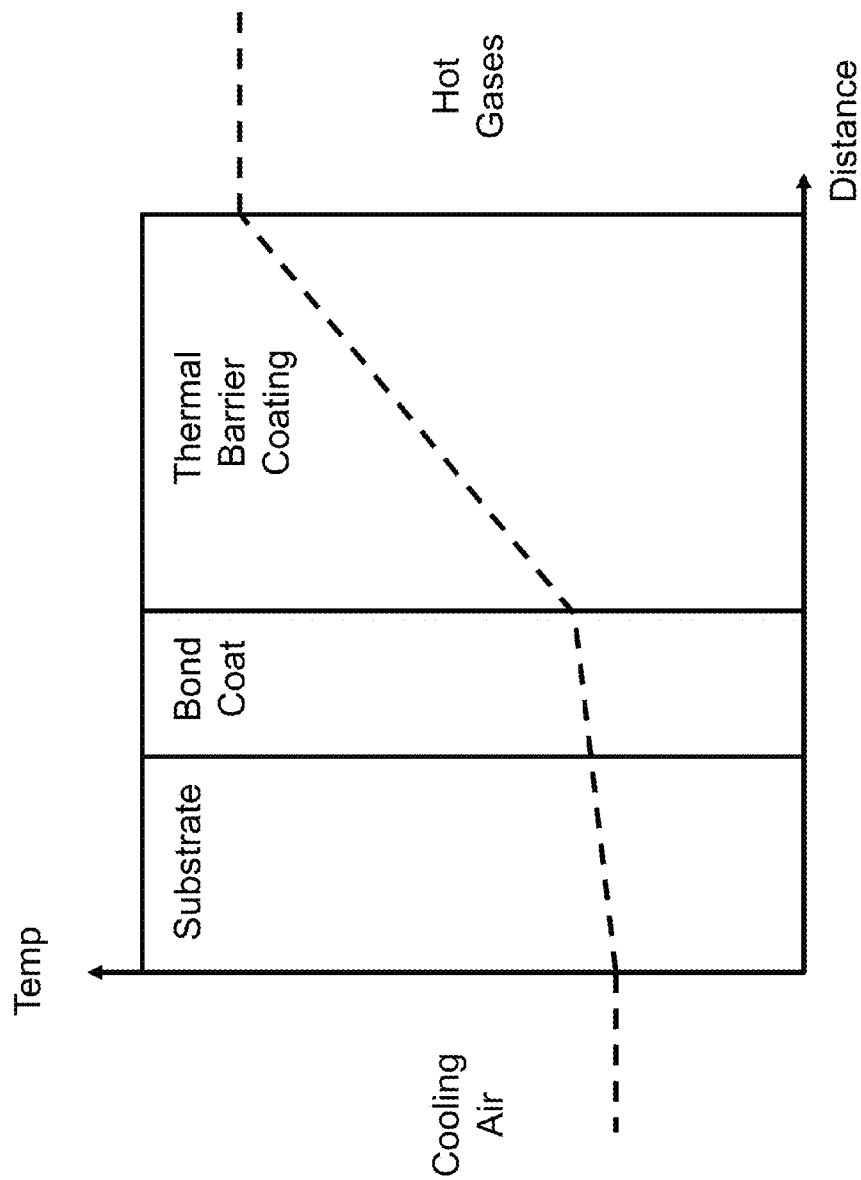
FIG. 1 is a schematic illustration of a thermal barrier coating system deposited on a superalloy.

The headings provided herein, if any, are for convenience only and do not necessarily affect the scope or meaning of the claimed invention.

There is a need or desire for new ceramic materials which have improved resistance to erosion and impact damage. For example, in the field of thermal management, many second generation, low thermal conductivity ceramic coatings employed as thermal barrier coatings exhibit inferior toughness to the industry standard, yttria-stabilized zirconia (YSZ).

In general, resistance to impact and erosion resistance in ceramics may be improved by introducing toughening mechanisms which raise the ceramic's resistance to crack propagation (e.g., fracture toughness (K), toughness (G)). Embodiments of the present disclosure can provide a two-phase ceramic which includes a plurality of toughening mechanisms at use temperatures of interest (e.g., approximately 1100° C. and higher) and exhibits improved toughness, while retaining its thermal insulating properties.

The first phase of the ceramic, in the as-deposited state, can include a metal oxide which exhibits a stable cubic fluorite phase (c), a stable tetragonal phase (t), or a meta-stable tetragonal phase (t'). Examples may include, but are not limited to, stabilized zirconium oxide (zirconia, $ZrO_2$) and stabilized hafnium oxide ($HfO_2$). In the discussion herein, embodiments of the ceramic composition may be discussed in terms of zirconium oxide. However, it may be understood the disclosed embodiments are not limited only to zirconia but may also include other metal oxides (e.g., hafnia).

As discussed in greater detail herein, in some embodiments, the first phase of the ceramic may provide transformation toughening. In this process, the tetragonal phase ahead of a crack under an applied external stress can convert to the higher volume monoclinic phase, arresting crack development. In alternative embodiments, the tetragonal phase ahead of a crack under an applied external stress may be non-transforming and instead rotates to align with the direction of the applied external stress, also arresting crack development. This is commonly referred to as ferroelastic toughening.

The second phase of the ceramic, in the as-deposited state, can include a compound chemically compatible with the stabilized metal oxide first phase. For example, no substantial chemical reaction takes place between the first and second phases. Furthermore, the second phase can possess low symmetry and anisotropic growth habit. In some embodiments, the second phase can include a magnetoplumbite-based aluminate phase. As discussed herein, this second phase can arrest crack development by the mechanism of crack bridging.

Ceramic Toughening Mechanisms

A brief discussion of transformation toughening, ferroelastic toughening, and crack bridging will now be presented.

Pure $ZrO_2$ can undergo crystallographic phase changes, from the monoclinic phase (m) to the tetragonal phase (t), to the cubic phase (c) with increasing temperature. The volume of zirconia can concurrently decrease when transforming from the m to t to c phase. However, addition of one or more stabilizing agents (e.g., oxides) may stabilize the t-phase in zirconia and inhibit the temperature-dependent phase transformation. In some embodiments, the tetragonal phase may be meta-stable, denoted by t'. However, it may be understood that reference to tetragonal phases herein may include both stable and meta-stable tetragonal phases.

Figures 2A, 2B:
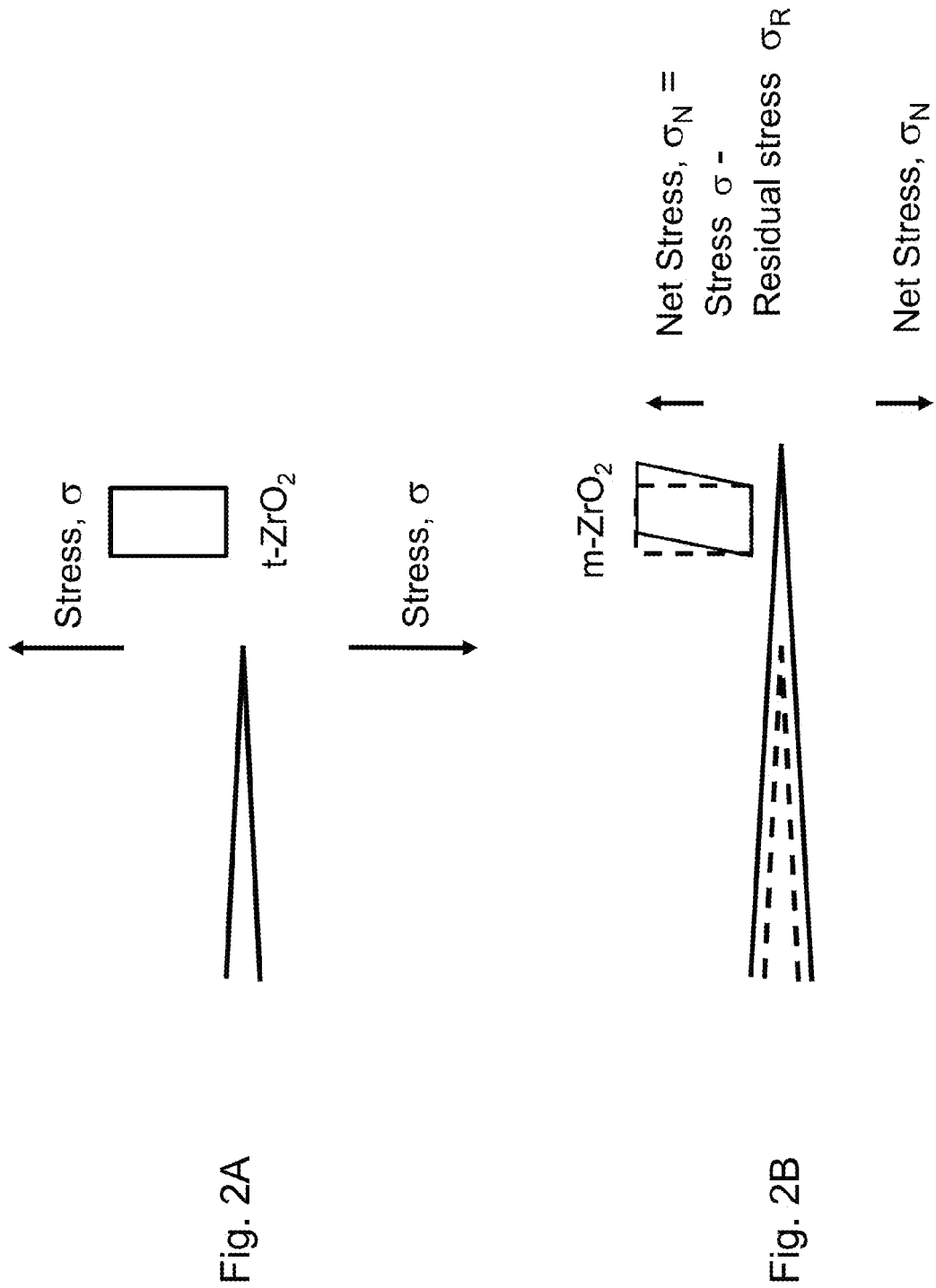
FIGS. 2A-2B are schematic illustrations of a transformation toughening mechanism.

In transformation toughened zirconia, the stabilizing agent can be provided in an amount such that the t-phase is meta-stable with temperature. For example, the t-$ZrO_2$ phase does not exhibit the transformation to another phase with temperature observed in pure zirconia. Instead, when a crack is initiated in the stabilized zirconia, as illustrated in FIG. 2A, some t-phase zirconia in the region of elevated stress ahead of the crack tip may be transformed to the m-phase. The volume expansion accompanying the t-$ZrO_2$ to m-$ZrO_2$ phase transformation can result in development of residual compressive stresses in the zirconia about the m-$ZrO_2$ which can reduce the net effect of the remote stress, as illustrated in FIG. 2B. Thus, absent an increase in the remotely applied stress, crack propagation can be arrested due to the phase transformation of t-$ZrO_2$ to m-$ZrO_2$, toughening the ceramic.

In ferroelastic toughening, a ceramic capable of forming a metastable tetragonal phase (e.g., zirconia, hafnia) can be employed. One or more stabilizing agents can be provided in respective amounts such that the t-phase does not transform to the m-phase on cooling. However, this t-phase can be distinguished from that observed in transformation toughening, as it does not transform to the m-phase when exposed to elevated stress either. With reference to FIGS. 3A and 3B, a crack is illustrated in a stabilized zirconia, where a region of the t-phase is present ahead of the crack tip. When the crack propagates under the influence of a remotely applied stress, some of the t-phase zirconia in the region of elevated stress ahead of the crack tip can rotate to become aligned in the direction of the remotely applied stress. In some situations, such an alignment can include an axis of the t-phase zirconia having a direction component common with a direction component of the remotely applied stress. This switching can cause residual stresses to develop in the zirconia about the switched t-$ZrO_2$ which reduces the net effect of the remote stress, as illustrated in FIG. 3B. As a result, further crack growth can be inhibited. In some situations, such a stoppage of crack growth can be realized is there is no significant increase in the remotely applied stress.

With reference to FIGS. 4A and 4B, in crack bridging, a second phase material can be dispersed within a first phase material. When the crack propagates under the influence of a remotely applied stress, it can impinge upon the second phase. Assuming that the second phase does not fracture, further growth of the crack can be achieved by deflection of the crack around the periphery of the second phase. The second phase can toughen the ceramic in two ways. First, in order for the crack to deflect about the second phase, debonding can occur between the second phase and the first phase. Accordingly, debonding typically requires that the applied stress be increased, which elevates the toughness of the two-phase ceramic. As the crack further propagates and opens, frictional sliding can take place between the surface of the second phase and the adjacent edges of the crack. The applied stress can also be increased to overcome the frictional sliding resistance between the crack and the second phase, further elevating the toughness of the two-phase ceramic.

Crack bridging has not previously been employed as a toughening mechanism in thermal barrier coatings. A technical barrier which has hindered implementation of crack bridging in TBCs has been the ability to identify second phases that are chemically compatible with the stabilized metal oxide. Notably, to form the second phase requires at least a ternary (three-component) system of the metal oxide, an oxide stabilizing the t-phase of the metal oxide, and an oxide of the magnetoplumbite former. As discussed in greater detail herein, more complex magnetoplumbites may also be formed from higher order systems (e.g., quaternary, or four components, five components, six components, seven components, etc.). However, the phase diagrams (e.g., equilibrium/meta-stable phases as a function of composition) of many ternary and higher component oxide systems, including those examples discussed herein, have not previously been measured. Accordingly, embodiments of the compatible second phases for stabilized metal oxides discussed herein have not previously been known.

Ceramic Composition

In an embodiment, the first phase of the ceramic may include a metal oxide which exhibits a cubic, tetragonal, or a meta-stable tetragonal phase after deposition on a substrate. For example, the metal oxide may be a stabilized metal oxide, in which one or more stabilizing elements are substituted for the zirconium atoms in $ZrO_2$. Examples of single stabilizing elements may be selected from, but are not limited to, Mg, Ca, Sc, Y, In, Ga, and lanthanides (e.g., La, Ce, Pr, Nd, Sm, Eu, Gd, Tb, Dy, Ho, Er, Tm, and Yb). In alternative embodiments, the zirconia may be co-stabilized with two elements, a first element selected from one of Mg, Ca, Sc, Y, In, Ga, and lanthanides (e.g., La, Ce, Pr, Nd, Sm, Eu, Gd, Tb, Dy, Ho, Er, Lu, Tm, and Yb) and a second element selected from Nb and Ta. The second phase may include aluminates with the magnetoplumbite structure.

Ternary TBC Compositions

In some embodiments, the ceramic composition may be formed from a ternary (three-component) system given by $Ln_2O_3$—$(Zr,Hf)O_2$—$Al_2O_3$. For clarity in the discussion herein, reference will be made to zirconia. However, it may be understood that embodiments of the disclosure may alternatively employ hafnia or another metal oxide capable of forming a stabilized tetragonal phase.

The addition of $Ln_2O_3$ and $Al_2O_3$ to the ceramic can promote formation of a second phase magnetoplumbite-based aluminate formed from $Ln_2O_3$—$Al_2O_3$ that is chemically compatible with a first tetragonal zirconia stabilized by Ln. In one embodiment, the magnetoplumbite-based aluminate can have the form $LnAl_{11}O_{18}$. Ln may be selected from lanthanides, including, but not limited to, La, Pr, Nd, and Sm. Notably, in embodiments of the ternary system, the same lanthanide, Ln, can be used to stabilize the zirconia and form a second phase magnetoplumbite-based aluminate compatible with the stabilized zirconia of that particular lanthanide.

Figure 5:
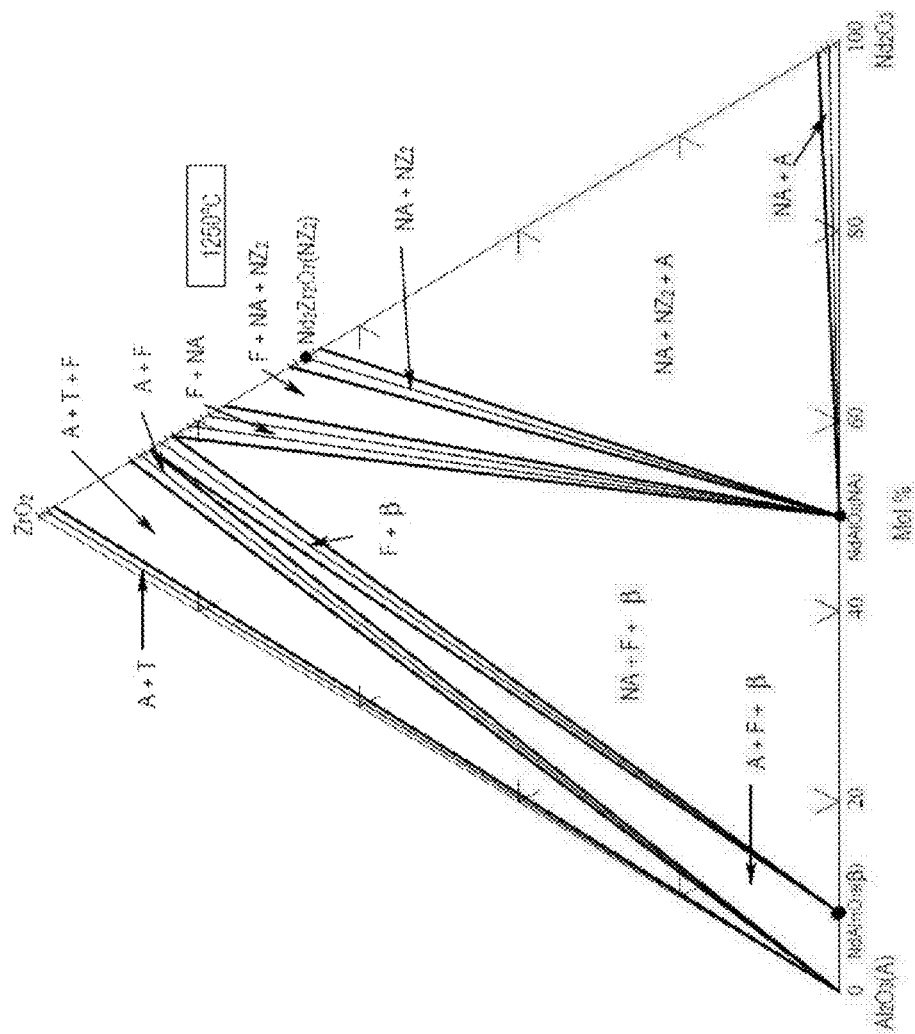
FIG. 5 is a phase diagram for the ternary ZrO$_2$—Nd$_2$O$_3$—Al$_2$O$_3$ system at about 1250° C.

For example, assume that Ln is Nd. The ternary phase diagram for $Nd_2O_3$—$ZrO_2$—$Al_2O_3$ at 1250° C. is illustrated in FIG. 5. In the phase diagram, A denotes the corundum phase of alumina, T denotes tetragonal $ZrO_2$, F denotes fluorite (cubic zirconia), $NZ_2$ denotes a pyrochlore-type phase, NA denotes a perovskite-type phase, and 13 denotes the magnetoplumbite-based aluminate, $NdAl_{11}O_{18}$.

The compositions of interest in this ternary system for use in generating the two-phase ceramic can include those given by the stable, two-phase field labeled F+β. This phase field extends between the vertices given by:
 about 10 mol. % $Nd_2O_3$-about 90 mol. % $Al_2O_3$-about 0 mol. % $ZrO_2$ ($NdAl_{11}O_{18}$) on the $Al_2O_3$—$Nd_2O_3$ axis (bottom of FIG. 5) to
 about 14 mol. % $Nd_2O_3$-about 0 mol. % $Al_2O_3$-about 86 mol. % $ZrO_2$ on the $ZrO_2$—$Nd_2O_3$ axis (right side of FIG. 5) to
 about 17 mol. % $Nd_2O_3$-about 0 mol. % $Al_2O_3$-about 83 mol. % $ZrO_2$ on the $ZrO_2$—$Nd_2O_3$ axis (right side of FIG. 5).

In this phase field, the second phase magnetoplumbite-based aluminate, $NdAl_{11}O_{18}$, can be present. Thus, it is expected that toughening due to crack bridging will take place in the ceramic. Stabilized $ZrO_2$ ($ZrO_2$—$Nd_2O_3$) may form the tetragonal or cubic phase zirconia on deposition of the composition and cooling. Accordingly, it is also expected that toughening due to at least one of transformation toughening and ferroelastic toughening will take place, depending on whether the tetragonal zirconia undergoes phase transformation under stress or is non-transforming and aligns with the external field under stress.

Although the phase diagram for FIG. 5 is isothermal, representing the phase states of the ternary $Nd_2O_3$—$ZrO_2$—$Al_2O_3$ system at 1250° C., it is expected that the desired F+β phase field will also persist at temperatures higher and lower than 1250° C. Notably, however, the shape of the F+β phase field may change with temperature. For example, it is expected that, as the temperature increases, the upper limit of $ZrO_2$ in the F phase (e.g., the intersection of the top leg of the phase field with the $ZrO_2$—$Nd_2O_3$ axis) will move towards greater $ZrO_2$ (upwards). Furthermore, it is expected that, as the temperature decreases, the lower limit of the $ZrO_2$ in the F phase (e.g., the intersection of the bottom leg of the phase field with the $ZrO_2$—$Nd_2O_3$ axis) will move towards greater $Nd_2O_3$ (downwards).

Quaternary Ceramic Compositions

In alternative embodiments, the ceramic composition may be formed from a quaternary (four component) system given by, for example, $Ln_2O_3$-$Ln'_2O_3$—$ZrO_2$—$Al_2O_3$. The two-phase ceramic formed from this system may include a second phase magnetoplumbite-based aluminate formed from $Ln_2O_3$ and $Al_2O_3$ that is chemically compatible with a first, tetragonal zirconia phase stabilized by Ln'. This quaternary system can be in contrast to the ternary system discussed herein, where Ln is employed both for forming the magnetoplumbite, as well as stabilizing the zirconia. In some embodiments, Ln can be a magnetoplumbite former with aluminum oxide and may be selected from lanthanides including, but not limited to, La, Pr, Nd, and Sm. In further embodiments, Ln' can be a trivalent stabilizer of zirconia different than Ln and may be selected from lanthanides (e.g., La, Ce, Pr, Nd, Sm, Eu, Gd, Tb, Dy, Ho, Er, Tm, and Yb) as well as Sc, Y, Lu, Ga, Fe, Mn, Cr, In, and Bi. The amount of the magnetoplumbite formed, in certain embodiments, may be between about 10 mol. % and less than about 50 mol. %.

Five Component Ceramic Compositions

In an embodiment, the ceramic composition may be formed from a five component system given by, for example, $MO_x$-$Ln_2O_3$-$Ln'_2O_3$—$ZrO_2$—$Al_2O_3$, where $MO_x$ can be a metal magnetoplumbite former with aluminum oxide and Ln and Ln' can be as described herein. The addition of the $MO_x$ metal oxide to the ceramic can promote formation of a two-phase ceramic including a more complex magnetoplumbite-based aluminate second phase formed from $MO_x$, $Ln_2O_3$, and $Al_2O_3$ that is chemically compatible with a first, tetragonal zirconia phase stabilized by Ln'. In some embodiments, M can be selected from Na, K, Mg, Li, Ca, Sr, and Ba. Ln can be a magnetoplumbite former with aluminum oxide and may be selected from lanthanides including, but not limited to, La, Pr, Nd, and Sm. In further embodiments, Ln' can be different from Ln and may be selected from lanthanides (e.g., La, Ce, Pr, Nd, Sm, Eu, Gd, Tb, Dy, Ho, Er, Tm, and Yb), as well as Sc, Y, Lu, In, Ga, Fe, Mn, Cr, and Bi. The amount of the magnetoplumbite formed, in some embodiments, may be between about 10 mol. % and less than about 50 mol. %.

In other embodiments, the ceramic composition may be formed from five component system given by, for example, $Ln_2O_3$-$Ln'_2O_3$-M'O—$ZrO_2$—$Al_2O_3$ or $Ln_2O_3$-$Ln'_2O_3$-M"O—$ZrO_2$—$Al_2O_3$. In these embodiments, the M'O or M"O can be employed in conjunction with Ln' as a co-stabilizer for $ZrO_2$. The two-phase ceramic formed from this system can include a magnetoplumbite-based aluminate second phase formed from $Ln_2O_3$ and $Al_2O_3$ that is chemically compatible with a first, tetragonal zirconia phase co-stabilized by both M' and Ln' or M" and Ln'. In some embodiments, M'O can be a divalent co-stabilizer of zirconia. For example, M' may be selected from Mg and Ca. In other embodiments, M"O can be a pentavalent co-stabilizer of zirconia. For example, M" may be selected from Nb, Ta, and Sb. Ln can be a magnetoplumbite former with aluminum oxide and may be selected from lanthanides including, but not limited to, La, Pr, Nd, and Sm. In further embodiments, Ln' can be a trivalent stabilizer of zirconia different than Ln and may be selected from lanthanides (e.g., La, Ce, Pr, Nd, Sm, Eu, Gd, Tb, Dy, Ho, Er, Tm, and Yb), as well as Sc, Y, Lu, In, Ga, Fe, Mn, Cr, and Bi). The amount of the magnetoplumbite formed, in some embodiments, may be between about 10 mol. % and less than about 50 mol. %.

Six Component Ceramic Compositions

In an embodiment, the ceramic composition may be formed from a six component system given by, for example, $MO_x$-$Ln_2O_3$-$Ln'_2O_3$-M'O—$ZrO_2$—$Al_2O_3$ or $MO_x$-$Ln_2O_3$-$Ln'_2O_3$-M"O—$ZrO_2$—$Al_2O_3$, where both $MO_x$ and M'O or $MO_x$ and M"O can be included in the composition, as discussed herein. The addition of the $MO_x$ metal oxide to the ceramic can promote formation a two-phase ceramic including a complex magnetoplumbite second phase formed from $MO_x$, $Ln_2O_3$, and $Al_2O_3$ that is chemically compatible with a first, tetragonal zirconia phase co-stabilized by Ln' and either M'O or M"O. M, M', M", Ln, and Ln' can be as described herein in the discussion of five component TBC systems. The amount of the magnetoplumbite formed, in some embodiments, may be between about 10 mol. % and less than about 50 mol. %.

Seven Component Ceramic Compositions

In an embodiment, the ceramic composition may be formed from a seven component system given by, for example, $MO_x$-$Ln_2O_3$-$Ln'_2O_3$-M"O-AO-$ZrO_2$—$Al_2O_3$, where AO, a divalent stabilizer of zirconia, can be added to a six component TBC composition as described herein. The two-phase ceramic formed from this system can include a complex magnetoplumbite-based aluminate formed from $MO_x$-$Ln_2O_3$—$Al_2O_3$ that is chemically compatible with a first, tetragonal zirconia phase stabilized by Ln' (trivalent zirconia stabilizer), M"O (pentavalent zirconia stabilizer), and AO (divalent zirconia stabilizer). M, M', M", Ln, Ln' can be as described herein and AO can be selected from divalent stabilizers of aluminum. A may be selected from Mg and Ca. The amount of the magnetoplumbite formed, in some embodiments, may be between about 10 mol. % and less than about 50 mol. %.

The example ceramic compositions described herein may be prepared for deposition on a substrate. For example, in one embodiment, a composition having one or more features as described herein may be prepared as a powder, suitable for spray deposition (e.g., plasma spray, high velocity oxygen fuel). In alternative embodiments, the composition may be prepared as an ingot suitable for vapor deposition (e.g., electron-beam physical vapor deposition (EB-PVD), electrostatic spray assisted vapor deposition (ESAVD), direct vapor deposition, etc.). The manner of preparing and depositing thermal barrier coating compositions are generally understood in the art and not discussed in detail herein.

Figure 6:
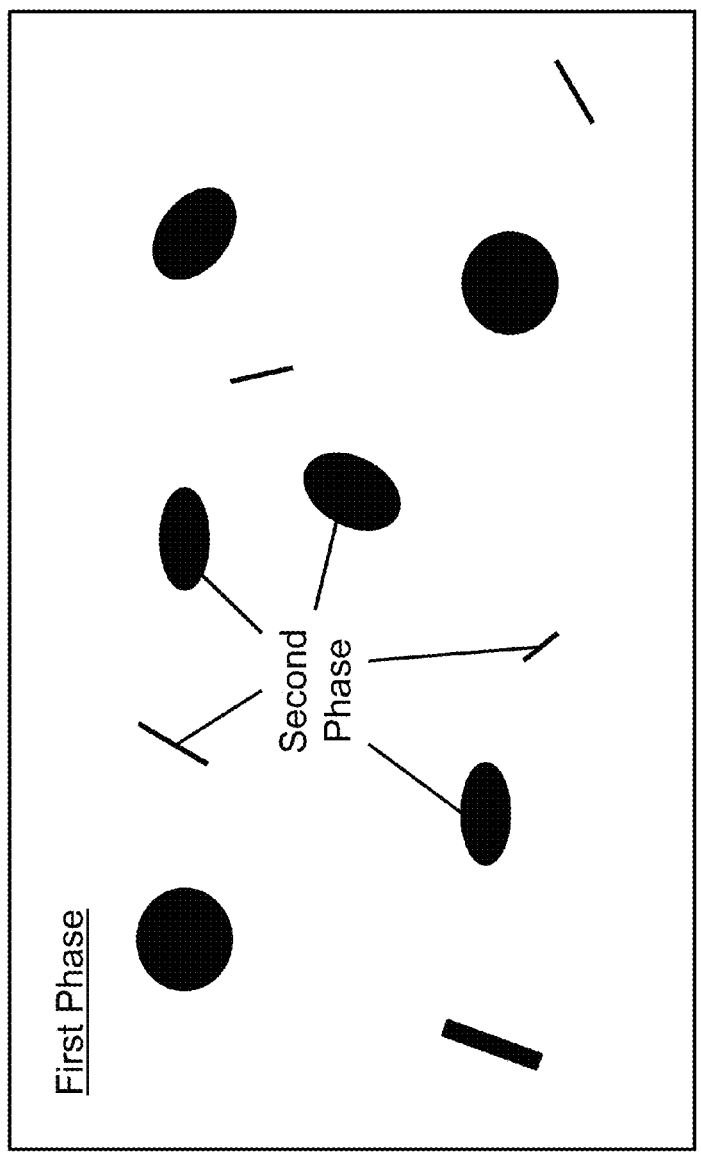
FIG. 6 is a schematic illustration of the microstructure of a two-phase ceramic of an embodiment of the present disclosure illustrating the stabilized metal oxide matrix and magnetoplumbite second phase.

FIG. 6 illustrates a schematic example of an anticipated microstructure of a two-phase ceramic composition as discussed herein, after deposition and cooling. For example, first phase of zirconia, at least a portion of which includes tetragonally stabilized zirconia, can surround a plurality of magnetoplumbite-based aluminate second phase particles. The second phase may be distributed throughout the first phase and may be oriented at a plurality of angles.

In order to illustrate the feasibility of obtaining crack bridging and, optionally, transformation or ferroelastic toughening, in embodiments of the disclosed ceramic compositions, the phases present in these compositions were characterized using X-ray diffraction (XRD). As illustrated in Table I below, 14 ceramic compositions were investigated at temperatures at about 1450° C., about 1500° C., and about 1600° C. As discussed above, in order to achieve toughening by crack bridging, the magnetoplumbite phase is typically present in the ceramic. Furthermore, in order to achieve either transformation toughening or ferroelastic toughening, tetragonal zirconia ((t) $ZrO_2$) is typically present in the ceramic.

TABLE I

| Sample | Composition (weight %) | Phases after 1450° C. | Phases after 1500° C. | Phases after 1600° C. |
|---|---|---|---|---|
| 1 | 50% $Zr_{.942}Y_{.058}O_{1.971}$ + 50% $LaAl_{11}O_{18}$ | | Fluorite + (m) $ZrO_2$+ Magnetoplumbite | Fluorite + (m) $ZrO_2$+ Magnetoplumbite |
| 2 | 50% $Zr_{.942}Y_{.058}O_{1.971}$ + 50% $NdAl_{11}O_{18}$ | | Fluorite + Corundum | Fluorite + Corundum |
| 3 | 50% $Zr_{.942}Y_{.058}O_{1.971}$ + 50% $LaMgAl_{11}O_{19}$ | | Fluorite + (m) $ZrO_2$+ Magnetoplumbite | Fluorite + (m) $ZrO_2$+ Magnetoplumbite |
| 4 | 50% $Zr_{.74}Nd_{.26}O_{1.87}$ + 50% $NdAl_{11}O_{18}$ | | Fluorite + Corundum+ $NdAlO_3$ (Perovskite) | Fluorite + Magnetoplumbite |
| 5 | 50% $Zr_{.70}Nd_{.30}O_{1.85}$ + | | Fluorite + Corundum+ | Fluorite + $NdAlO_3$ |

TABLE I-continued

| Sample | Composition (weight %) | Phases after 1450° C. | Phases after 1500° C. | Phases after 1600° C. |
|---|---|---|---|---|
|  | 50% NdAl$_{11}$O$_{18}$ |  | NdAlO$_3$ (Perovskite) | (Perovskite)+ Magnetoplumbite |
| 6 | 50% Zr$_{.67}$Nd$_{.33}$O$_{1.835}$ + 50% NdAl$_{11}$O$_{18}$ |  | Fluorite + Corundum+ NdAlO$_3$ (Perovskite) | Fluorite + NdAlO$_3$ (Perovskite)+ Magnetoplumbite |
| 7 | 50% Zr$_{.67}$Y$_{.167}$Ta$_{.167}$O$_2$ + 50% NdAl$_{11}$O$_{18}$ |  | (t) ZrO$_2$+ Pyrochlore + Corundum | (t) ZrO$_2$+ Corundum |
| 8 | 50% Zr$_{.67}$Y$_{.167}$Ta$_{.167}$O$_2$ + 50% LaMgAl$_{11}$O$_{18}$ |  | (t) ZrO$_2$+ Magnetoplumbite | (t) ZrO$_2$+ (m) ZrO$_2$+ Magnetoplumbite |
| 9 | 50% Zr$_{.82}$Y$_{.09}$Ta$_{.09}$O$_2$ + 50% NdAl$_{11}$O$_{18}$ | (t) ZrO$_2$ + (m) ZrO$_2$ + Corundum | Fluorite + Corundum+ NdAlO$_3$ (Perovskite) |  |
| 10 | 50% Zr$_{.82}$Y$_{.09}$Ta$_{.09}$O$_2$ + 50% LaMgAl$_{11}$O$_{19}$ |  | Fluorite + (m) ZrO$_2$+ Magnetoplumbite | Fluorite + (m) ZrO$_2$+ Magnetoplumbite |
| 11 | 50% Zr$_{.67}$Y$_{.167}$Nb$_{.167}$O$_2$ + 50% NdAl$_{11}$O$_{18}$ |  | Fluorite + Pyrochlore + Magnetoplumbite | Fluorite + Corundum+ NdAlO$_3$ (Perovskite) |
| 12 | 50% Zr$_{.67}$Y$_{.167}$Nb$_{.167}$O$_2$ + 50% LaMgAl$_{11}$O$_{18}$ |  | Fluorite + Magnetoplumbite | Fluorite + (m) ZrO$_2$+ Magnetoplumbite |
| 13 | 50% Zr$_{.82}$Y$_{.09}$Nb$_{.09}$O$_2$ + 50% NdAl$_{11}$O$_{18}$ |  | Fluorite + (m) ZrO$_2$+ Corundum | Fluorite + (m) ZrO$_2$+ Corundum |
| 14 | 50% Zr$_{.82}$Y$_{.09}$Nb$_{.09}$O$_2$ + 50% LaMgAl$_{11}$O$_{19}$ |  | Fluorite + (m) ZrO$_2$+ Magnetoplumbite | Fluorite + (m) ZrO$_2$+ Magnetoplumbite |

It may be observed that magnetoplumbite is found to be present in compositions 1, 3-6, 8, 10-12, and 14 for at least at one of 1450° C., 1500° C., and 1600° C. Furthermore, tetragonal zirconia is found to be present in compositions 7-9 for at least at one of 1450° C., 1500° C., and 1600° C. Thus, compositions 1, and 3-12 are expected to exhibit improved toughness due to at least one of crack bridging, transformation toughening, and ferroelastic toughening. Furthermore, of these compositions, composition 8 is observed to possess both magnetoplumbite and tetragonal zirconia. Thus, it is expected that composition 8 would possess even higher toughness due to both crack bridging and at least one of transformation toughening and ferroelastic toughening.

Figure 7B:
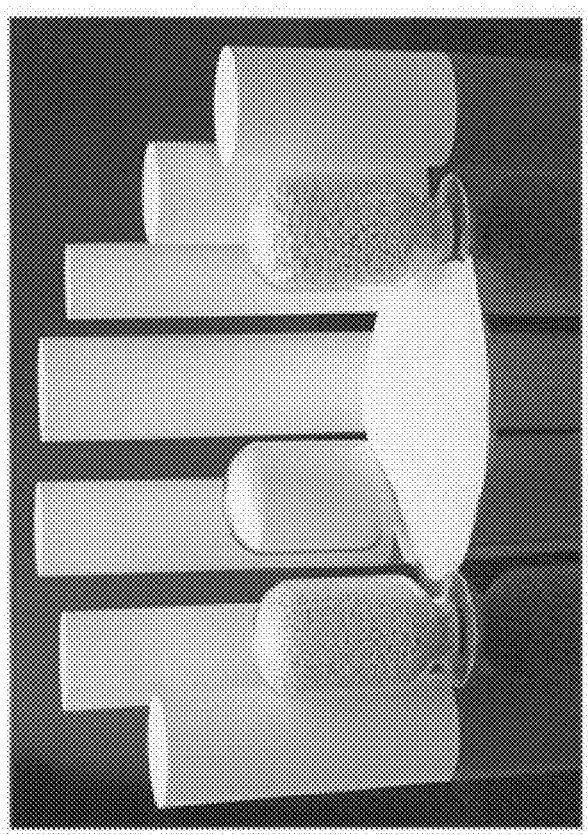
FIGS. 7A and 7B illustrate example applications suitable for embodiments of the disclosed ceramic compositions.
Figure 7A:
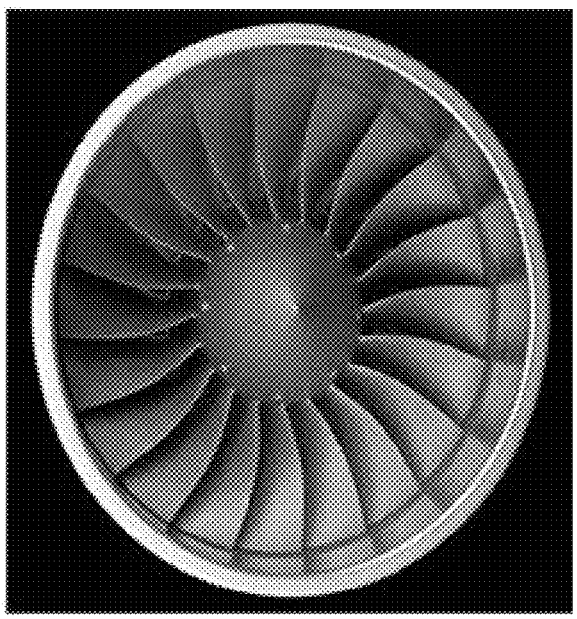

Embodiments of the multi-phase ceramic discussed herein may be used in thermal management applications. In one example, a ceramic having one or more features as described herein may be employed in a thermal barrier coating deposited upon a substrate (e.g., a metallic surface) employed in an elevated temperature environment. The coating may serve to insulate the substrate from high heat load, allowing the substrate to operate at higher temperatures than would be possible without such a coating. For example, thermal barrier coatings may be deposited upon hot zone components in gas turbine engines (e.g., gas-turbine powered electrical generators, turbojet and turbofan engines, etc.). Examples of hot zone components may include, but are not limited to, combustor liners, combustor shrouds, and turbine blades. An example of a turbojet engine is illustrated in FIG. 7A. In other embodiments, thermal barrier coatings may be applied to components employed in automotive applications such as engine exhaust system components (e.g., exhaust manifolds, turbocharger casings, exhaust headers, downpipes, tailpipes, etc.).

In further embodiments, one or more of the disclosed ceramic compositions may be employed in ceramic applications where improved toughness is desired. In some implementations, such ceramic compositions may be prepared using processing operations known in the art including, but not limited to, milling, batching, mixing, forming, drying, firing, etc. In some implementations, objects having the ceramic compositions may be formed by mechanisms including, but not limited to, extrusion, pressing, casting, etc. Examples of formed ceramic objects are illustrated in FIG. 7B.

Figure 8:
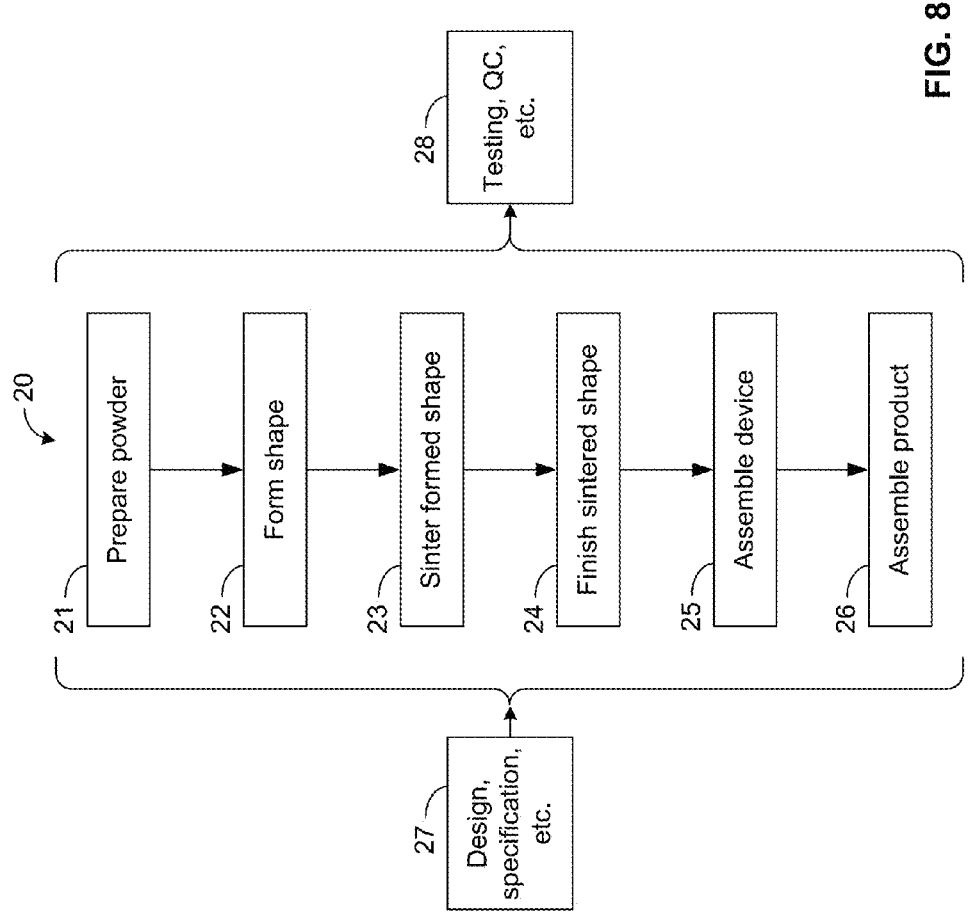
FIG. 8 shows an example process that can be implemented to fabricate ceramic materials.

FIG. 8 shows a process 20 that can be implemented to fabricate a ceramic material having one or more properties described herein. In block 21, powder can be prepared. In some implementations, such powder preparation can include heating to yield one or more desired results as described herein.

In block 22, a shaped object can be formed from the prepared powder. In block 23, the formed object can be sintered in implementations where sintering of the formed object is desired. In some implementations, the prepared powder can be used without being formed into shaped objects. In some implementations, the prepared powder can be formed into shaped objects; but such shaped objects may not be sintered. In block 24, the sintered object can be finished to yield a finished ceramic object having one or more desirable properties.

In implementations where the finished ceramic object or material is part of a device, the device can be assembled or the material can be applied to the device in block 25. In implementations where the device or the finished ceramic object is part of a product, the product that benefits from one or more features as described herein can be assembled in block 26.

FIG. 8 further shows that some or all of the steps of the example process 20 can be based on a design, specification, etc. Similarly, some or all of the steps can include or be subjected to testing, quality control, etc.

Figure 9:
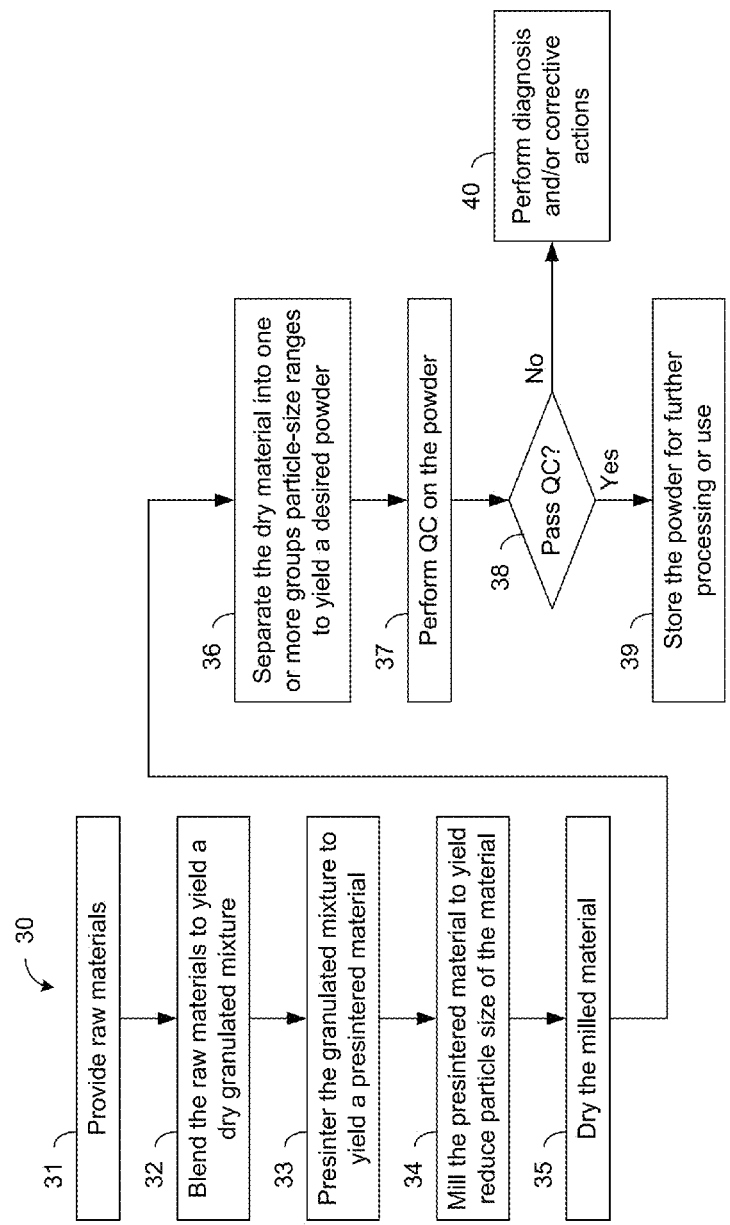
FIG. 9 shows an example process that can be implemented to fabricate powder having one or more features as described herein.
Figure 10:
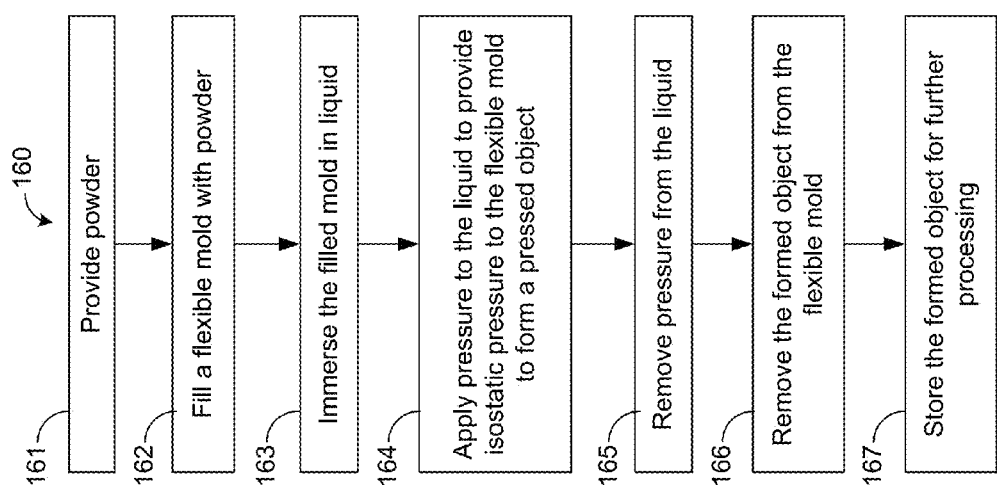
FIG. 10 shows an example process that can be implemented to form an ingot from the fabricated powder.

FIG. 9 shows a process 30 that can be implemented to prepare a powder having one or more features described herein. Such a powder can be used as is, or can be formed into desired shapes as described herein. In block 31 raw materials can be provided. Such raw materials can be selected to yield one or more desired properties of the prepared powder, an object formed from such a powder, and/or a ceramic object resulting from sintering of such a formed object.

In block 32, the raw materials can be blended to yield a dry granulated mixture. Such blending can be achieved in a number of ways. For example, an Eirich blending method or a Cowles blending method can be utilized.

In block 33, the granulated mixture can be pre-sintered to yield a pre-sintered material. For the purpose of description, it will be understood that such pre-sintering can include implementations where such pre-sintered material will be formed into shapes for another sintering process. In implementations where such pre-sintered material will not be formed into shapes, or where shapes formed from such pre-sintered material will not undergo another sintering process, the pre-sintering of the granulated mixture can be configured so that the resulting material has one or more desired properties as described herein.

In block 34, the pre-sintered material can be milled to yield reduced particle size of the pre-sintered material. Such a milling process can yield refined and regulated particles from the pre-sintered material.

In block 35, the milled material can be dried. In some implementations, such a drying process can include a spray drying process. In some implementations, the spray-drying process can be used to produce free-flowing powder suitable for a forming process. Milled material as described herein can be mixed with a binder material in a tank to form a slurry. The resulting mixture can be poured through a fine meshed screen to separate oversized particles from usable particles. Next, the screened slurry can be pumped into a dryer chamber through a pipe and a nozzle at or near the bottom of the chamber, creating a fountain-like spray. Formation of flowable powder can occur through the action of downward-flowing heated air meeting the upward spray of the slurry in the dryer chamber and forming small spherical dry particles. More coarse particles can drop to a lower collection chamber, and finer particles can be collected in an upper cyclone collection chamber. In some implementations, size of the spray dried particles can be adjusted by exchanging the orifice size of the nozzle and controlling the feed-air flow ratio. After spray-drying in the foregoing manner, the dried powder can be collected for screening.

In block 36, the spray-dried powder material can be separated into one or more groups of particle-size ranges to yield one or more powders having desired ranges of particle sizes. In some implementations, such a separation process can be achieve by a separator such as a vibro-energy separator. Separation of spray-dried material into different groups of comparable sizes in the foregoing manner can allow collection of particles having sizes in a desired range.

In block 37, a quality-control (QC) test can be performed on a selected group of spray-dried powder (e.g., a group having particle sizes in a desired range). If the QC test is passed in a decision block 38, the process 30 can proceed to block 39 where the powder can be stored for further processing or use. If the QC test is failed, the process 30 can proceed to block 40 where one or more diagnosis and/or corrective actions can be performed.

In some implementations, materials having one or more features as described herein can be formed into ingots for use during end applications such as thermal barrier coating. In some embodiments, such ingots can be formed by an iso-press process 160. In block 161, powder can be provided. In some implementations, such powder can be prepared as described herein. In block 162, a flexible mold can be filled with the powder. In block 163, the filled mold can be immersed in fluid. In some implementations, such a fluid can include generally incompressible liquids such as water. In process 164, pressure can be applied to the liquid to provide isostatic pressure to the flexible mold to thereby form a pressed object from the powder therein. In block 165, pressure can be removed from the liquid. In block 166, the formed object can be removed from the flexible mold. In block 167, the formed object can be stored for further processing or use.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It may be understood that embodiments of any disclosed processes or flow diagrams may include greater or fewer operations and that such operations may be performed in a different order than that discussed.

Conjunctive language such as the phrase "at least one of X, Y and Z," unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

Terms of approximation, such as "about," "approximately," "substantially," and equivalents, when used in language such as the phrase "about X to Y" to describe a range of values may be understood to mean "about X to about Y," where X is a lower bound of the disclosed range and Y is an upper bound of the disclosed range.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings.

What is claimed is:

1. A multiphase ceramic for a thermal barrier coating comprising:
   a first phase formed from a zirconium oxide ($ZrO_2$) stabilized with a neodymium oxide, the first phase performing either transforming toughening or ferroelastic toughening; and
   a second phase formed from a magnetoplumbite-based aluminate that is chemically compatible with the first phase and performs crack bridging, the second phase being dispersed within the first phase.

2. The ceramic of claim 1 wherein the magnetoplumbite-based aluminate is $LnAl_{11}O_{18}$, and Ln is selected from the group consisting of La, Pr, Nd, and Sm.

3. The ceramic of claim 1 wherein the magnetoplumbite-based aluminate is $NdAl_{11}O_{18}$.

4. The ceramic of claim 1 wherein the magnetoplumbite-based aluminate is present in a mole fraction between about 10% to less than 50% on the basis of the total volume of the ceramic.

5. A thermally insulated component for a gas turbine engine, comprising:
   a substrate configured to receive a coating; and
   a low thermal conductivity ceramic coating deposited upon a surface of the substrate, the ceramic coating including a first phase formed from a zirconium oxide ($ZrO_2 $) stabilized with neodymium oxide and performing either transforming toughening or ferroelastic toughening, and a second phase dispersed within the first phase and formed from a magnetoplumbite-based aluminate that is chemically compatible with the first phase and performs crack bridging.

6. A method for fabricating a multiphase ceramic, the method comprising:
preparing a composition including neodymium oxide, a magnetoplumbite-based aluminate, and zirconium oxide;
forming, from the composition, a first phase from a the zirconium oxide stabilized by the neodymium oxide, the first phase configured to perform either transforming toughening or ferroelastic toughening; and
forming a second phase from the magnetoplumbite-based aluminate that is chemically compatible with the first phase, the second phase configured to perform crack bridging.

7. The ceramic of claim 1 wherein the zirconium oxide ($ZrO_2 $) is tetragonally stabilized.

8. The method of claim 6 further comprising forming a thermal barrier coating from the first phase and the second phase.

9. The method of claim 6 further comprising forming a powder from the first phase and the second phase.

10. The ceramic of claim 1 wherein the zirconium oxide stabilized with the neodymium oxide is in the form of tetragonal or cubic phase zirconia.

11. The ceramic of claim 1 wherein the ceramic is applied as a layer.

12. The ceramic of claim 1 wherein no substantial chemical reaction takes place between the first phase and the second phase.

13. The ceramic of claim 1 wherein the first phase and the second phase have approximately the same weight %.

14. The ceramic of claim 1 wherein the ceramic includes fluorite and magnetoplumbite-based aluminate.

15. The ceramic of claim 1 wherein the ceramic retains crack resistant at temperatures of 1250° C. and above.

16. The thermally insulated component of claim 5, wherein the first phase surrounds a plurality of particles formed from the second phase, the second phase being oriented at a plurality of angles with respect to the first phase.

17. The thermally insulated component of claim 5 wherein the magnetoplumbite-based aluminate is $LnAl_{11}O_{18}$, and Ln is selected from the group consisting of La, Pr, Nd, and Sm.

18. The thermally insulated component of claim 5 wherein the magnetoplumbite-based aluminate is $NdAl_{11}O_{18}$.

19. The method of claim 6 wherein the magnetoplumbite-based aluminate is $LnAl_{11}O_{18}$, and Ln is selected from the group consisting of La, Pr, Nd, and Sm.

20. The method of claim 6 wherein the magnetoplumbite-based aluminate is $NdAl_{11}O_{18}$.

* * * * *

UNITED STATES PATENT AND TRADEMARK OFFICE
CERTIFICATE OF CORRECTION

PATENT NO. : 9,988,309 B2
APPLICATION NO. : 13/896884
DATED : June 5, 2018
INVENTOR(S) : Michael David Hill It is certified that error appears in the above-identified patent and that said Letters Patent is hereby corrected as shown below:

In the Claims

In Column 15 at Line 12, in Claim 6, change "a the" to --the--.

Signed and Sealed this
Fourth Day of September, 2018

Andrei Iancu
*Director of the United States Patent and Trademark Office*